INVENTORS
Donald B. Levinson
Edward Lindell
BY

Attorney

CONTROL SYSTEM FOR MAGNETIC MEMORY DRUM

Filed Jan. 3, 1961 4 Sheets-Sheet 3

United States Patent Office 3,147,462
Patented Sept. 1, 1964

3,147,462
CONTROL SYSTEM FOR MAGNETIC MEMORY DRUM

Donald B. Levinson, Beverly Hills, and Edward Lindell, Los Angeles, Calif., assignors to General Precision, Inc., a corporation of Delaware Filed Jan. 3, 1961, Ser. No. 80,274
3 Claims. (Cl. 340—174.1)

The present invention relates to electrical systems, such as digital computers, data processors, and the like, of the type which use rotatable magnetic drums, or other movable types of memory units; and the invention relates more particularly to a new and improved control system for use in conjunction with such movable memory units to indicate the presence of a mechanical malfunction and/or to produce certain control effects in the presence of such a mechanical malfunction.

In many applications it is most important that digital computers, and similar electronic equipment, continue to operate uninterruptedly, and serious consequences can occur in the event of operational failure of the equipment. An example of this is in the use of digital computers and data processors in air traffic control systems. It is obviously a matter of paramount importance in air traffic control systems for the digital computers utilized therein to be relied upon to operate without the likelihood of operational failure.

Insofar as the electrical and electronic circuitry of the computer is concerned, computers can be built to exhibit a high degree of operational reliability, and to be free from any likelihood of breakdown if normal servicing procedures are followed. However, the mechanical nature of the rotatable memory drums, or equivalent movable memory units, used in such computers, presents a likelihood of operational failure due to mechanical limitations, and freedom from such failure cannot be guaranteed with any high degree of assurance.

It is accordingly, an important object of the present invention to provide a new and improved control system for use in electrical digital computers, or in other electrical and electronic apparatus using movable memory storage apparatus to produce a desired indicating and/or control effect should the operational speed of the memory unit change from a pre-determined value.

A more general object of the invention is to provide a new and improved control system for use in conjunction with movable memory units, and which is capable of indicating mal-functioning of the unit.

A further object of the invention is to provide such an improved control system which is capable in one embodiment of automatically transferring information from a first movable memory unit to an auxiliary memory unit, in the event of malfunctioning of the first memory unit.

As noted above, the malfunctioning of the movable drum memory unit in a digital computer, and the like, is usually accompanied by a change in speed of the unit, such malfunctioning includes, for example, a freezing of the bearings, or similar mechanical defects. The control system of one embodiment of the invention responds to a change in speed of the memory unit to sound an alarm upon such change in speed, for example, and thereby apprise the operator that a malfunctioning has occurred.

In a further embodiment of the invention to be described, the improved control system is also instrumental in causing a standby auxiliary magnetic drum unit to be energized and brought up to speed, and for transferring the information from the faulty memory unit to the standby auxiliary memory unit automatically, and before the faulty memory unit has become completely disabled. A feature of the control system of the invention is to sense that the speed of the magnetic memory drum on which information is stored has fallen below a pre-determined rotational speed. When the circuitry included in the control system senses such a slow down, a signal is produced which either sounds an alarm or initiates the transfer of the drum information to other memory drums. The circuitry may be the type which automatically resets itself, or it may be of a manually reset type.

The embodiment referred to in the preceding paragraph operates in a manner such that the information is selected from the faulty magnetic memory unit and transferred to the auxiliary memory unit, essentially without breaking the flow of information to the associated computer or data processor. In this manner, the operation of the computer or data processor continues without noticeable interruption, as the faulty memory unit is removed from the system and replaced by the auxiliary memory unit.

Other objects and advantages of the information will become apparent from a consideration of the following specification, when taken in conjunction with the accompanying drawings, in which.

Figure 1:
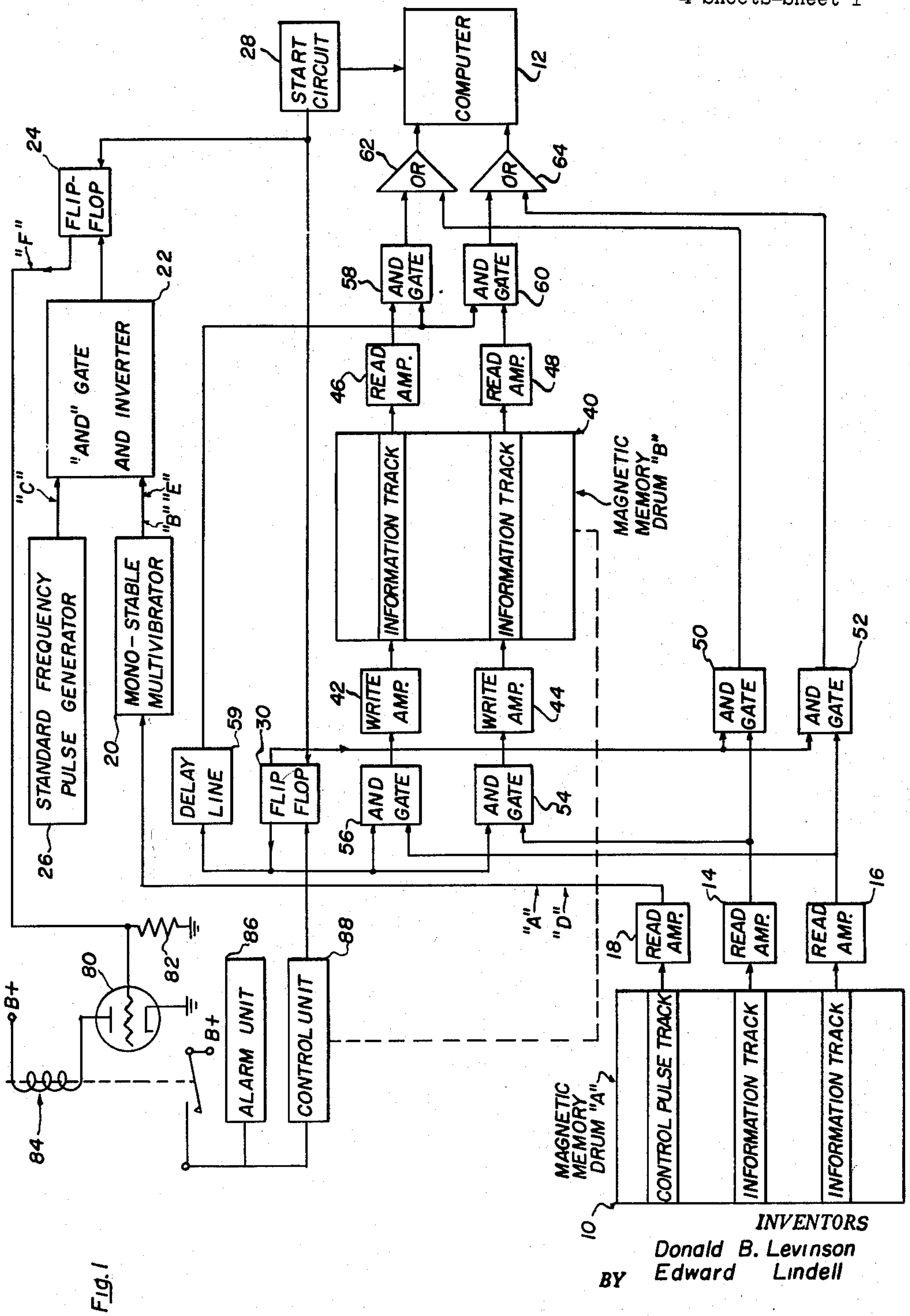
FIGURE 1 is a block diagram of a control system constructed in accordance with one embodiment of the invention, and which is capable not only of activating an alarm when a main magnetic memory drum becomes faulty, but of also transferring information from the main magnetic memory drum automatically to an auxiliary memory drum upon the malfunctioning of the former.

The system of FIGURE 1 includes a first magnetic memory drum 10. This memory drum may be of any useful suitable type, and it is rotatably mounted to be rotated in the usual manner. The rotatable magnetic memory drum 10 includes a plurality of adjacent peripheral tracks which are scanned by respectively associated read heads (not shown). The different tracks contain information to be utilized by an associated electronic digital computer 12 of any known type. Two of the tracks are illustrated in FIGURE 1, and the magnetic recordings on these tracks are read by the associated read heads (not shown). The resulting electrical signals are amplified by respective read amplifiers 14 and 16. It will be understood, that additional tracks on the memory drum 10 will usually be utilized by the computer for memory storage, for circulating registers, and so on; and that the magnetic recordings on these tracks will be converted to electrical signals and amplified by appropriate read amplifiers (not shown).

In accordance with the present invention, the memory drum 10 includes a control pulse track which contains a series of regularly spaced recorded pulses. In a constructed embodiment, for example, 125 regularly spaced pulses were recorded in the control pulse track. These pulses are scanned by an appropriate read head (not shown) and the resulting electrical pulses are amplified by a read amplifier 18.

The read amplifier 18 is coupled to a monostable multivibrator 20 of any known and suitable type, and the output of the monostable multivibrator is introduced to an "and" gate and inverter network 22. The "and" gate and inverter network 22 is coupled to one of the input terminals of a bistable multivibrator, or flip-flop 24.

Monostable multivibrators, "and" gates, "or" gates, inverters, and flip-flops, are well understood to the electronic digital computer art, and are presently in widespread use. For that reason, and because the circuitry of these components forms no part of the present invention, it is believed unnecessary to illustrate or describe the circuit details of the individual components. A description of these components may be found, for example, in chapters 4 and 5 of "Digital Computer Fundamentals" Thomas C. Bartee, Lincoln Laboratory, Massachusetts Institute of Technology, published 1960, by the McGraw-Hill Book Company, New York.

A standard frequency pulse generator 26 is also connected to the "and" gate and inverter network 22. A start circuit 28 is connected to the computer 12, to a second input terminal of the flip-flop 24, and to an input terminal of a second flip-flop 30. The start circuit 28 includes, for example, a push-button switch which may be manually operated. When the push-button switch is depressed, the start circuit 28 produces an output pulse which triggers the flip-flops 24 and 30 to a first of their two stable states.

The system of FIGURE 1 also includes an auxiliary rotatably mounted magnetic memory drum 40. The drum 40 may be similar in all respects to the main memory drum 10. The auxiliary memory drum 40 includes information tracks corresponding to the information tracks on the drum 10. A pair of write amplifiers 42 and 44, for example, are coupled through appropriate write heads (not shown) to the respective information tracks on the auxiliary drum 40. Likewise, these information tracks are scanned by a suitable read heads which, in turn, are coupled to respective read amplifiers 46 and 48.

The read amplifiers 14 and 16 are coupled respectively to a pair of "and" gates 50 and 52, and respectively to a pair of "and" gates 54 and 56. The read amplifiers 46 and 48 are respectively coupled to a pair of "and" gates 58 and 60. One of the output terminals of the flip-flop 30 is connected to the "and" gates 54 and 56, and through a delay line 54 to the "and" gates 58 and 60. The other terminal of the flip-flop 30 is connected to the "and" gates 50 and 52.

The "and" gates 50 and 58 are connected to an "or" gate 62, and the "and" gates 52 and 60 are connected to an "or" gate 64. The "or" gates 62 and 64 are coupled to the digital computer 12, and these "or" gates serve to feed the required information from the main memory drum 10, or from the auxiliary memory drum 40 to the computer 12.

One of the output terminals of the flip-flop 24 is connected to the control grid of a triode 80 and to a grounded resistor 82. The cathode of the triode 80 is grounded, and the anode is connected through the energizing coil of a relay 84 to the positive terminal B+ of a source of direct current potential. The relay 84 includes a pair of normally-open contacts which are connected between the positive terminal B+ and an alarm unit 86. The alarm unit 86 may be of any suitable type, and it is constructed to create an indication upon the closure of the normally-open contacts of the relay 84. This alarm unit may, for example, be an indicating lamp circuit, an alarm bell circuit, etc.

The normally-open contacts of the relay 84 are also connected to a control unit 88. The control unit 88 includes a usual circuit-breaker assembly. This circuit-breaker assembly responds to the closure of the normally-open contacts of the relay 84 to establish an energizing circuit to the auxiliary memory drum 40. When this energizing circuit is established, the drive motor of the auxiliary memory drum 40 is energized, and the drum is brought up to a pre-established rotational speed.

The control unit 88 also includes an appropriate circuit which introduces a pulse to the other input terminal of the flip-flop 30 after a pre-determined time interval following the establishment of the energizing circuit to the drive motor of the auxiliary memory drum 40. This latter control is such that the flip-flop 30 is triggered thereby after the drum 40 has been brought up to its operational rotational speed.

Under normal circumstances the system of FIGURE 1 is first activated by a manual control of the start circuit 28. This control causes the flip-flops 24 and 30 each to be triggered to a first of their two stable states, and also places the computer 12 in operation. When the flip-flop 24 is established in the above mentioned one of its stable states, the triode 80 is non-conductive and the relay 84 is de-energized. Therefore, under normal operating conditions, the alarm unit 80 and the control unit 88 are both de-activated.

When the flip-flop 30 is in its first stable state, the "and" gates 50 and 52 are enabled. This permits the outputs from the read amplifier 14 and from the read amplifier 16 to be passed through the "and" gates 50 and 52 and through the "or" gates 62 and 64 to the computer 12.

Under the normal operating conditions, as initiated by the events described above, the control pulses recorded in the control pulse track of the memory drum 10 are amplified by the read amplifier 18 and introduced to the monostable multi-vibrator 20.

Figure 2:
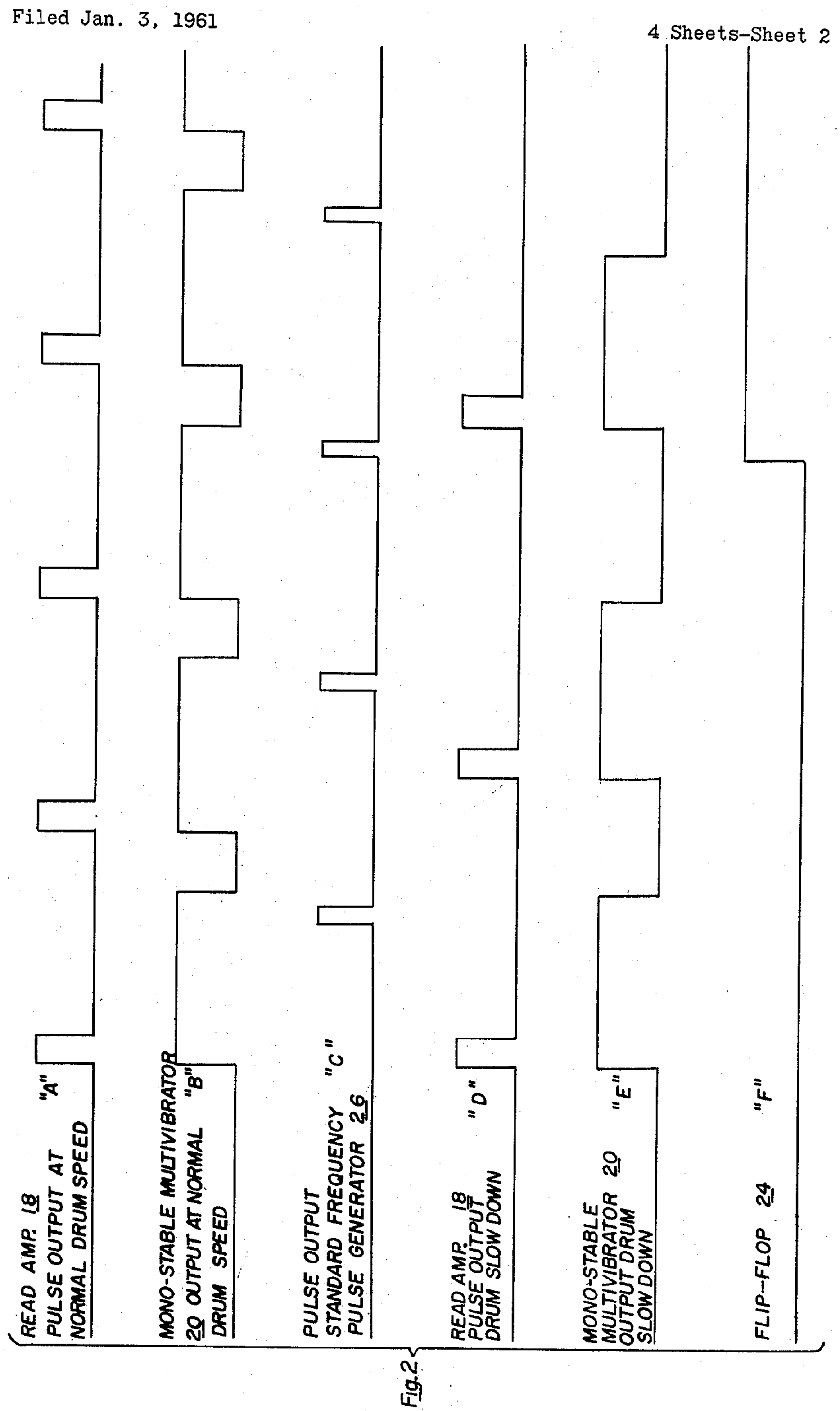
FIGURE 2 is a series of curves which are useful in explaining the operation of the system of FIGURE 1.

As shown in FIGURE 2, the pulses from the read amplifier 18, designated A in FIGURE 1 and illustrated in the curve A of FIGURE 2 have a pre-determined repetition frequency, so long as the magnetic memory drum 10 is rotating at normal speed. These pulses are introduced to the monostable multivibrator 20, as mentioned above, and they cause the monostable multivibrator to develop a rectangular wave signal designated B in FIGURE 1 and represented by the wave form B of FIGURE 2.

As represented by the curves A and B in FIGURE 2, the leading edge of each of the pulses of the curve A triggers the monostable multivibrator 20 from its stable state to its unstable state. The monostable multivibrator then remains in its unstable state for a pre-determined time interval, established by the parameters of the multivibrator and it then returns to its stable state.

The standard frequency pulse generator 26 generates a series of reference frequency pulses of a pre-determined fixed frequency. These pulses are designated C in FIGURE 1, and they are represented by the curve C in FIGURE 2.

So long as the drum 10 continues to rotate at a normal speed, a pre-determined first relationship exists between the signals of curves B and C in FIGURE 2. So long as this relationship exists, the pulses C occur during intervals when the monostable multivibrator 20 is in its unstable state. The "and" gate and inverter network 22 responds to the two signals of the curves B and C; and so long as the illustrated first relationship between these two signals is maintained, no output is developed by the network 22. This means that the flip-flop 24 remains in its first stable state so long as the magnetic memory drum 10 continues to rotate at a normal speed.

Should the speed of the magnetic memory drum 10 change for any reason, there is a likelihood that the change was due to a malfunctioning of the mechanical drive assembly for the memory drum, as mentioned above. When such a change in speed occurs, the pulse output from the read amplifier 18 changes in repetition frequency, such as shown by the curve D in FIGURE 2 and designated D in FIGURE 1. This change in repetition frequency of the pulses of curve D causes the monostable multivibrator 20 to produce a rectangular wave output, designated E in FIGURE 1 and represented by the curve E in FIGURE 2. This rectangular wave of the curve E has a different phase relationship with the reference pulses of curves from the pulse generator 26. This changed phase relationship causes certain ones of the pulses of the curve C to occur when the monostable multivibrator 20 is in its stable state. As illustrated in FIGURE 2, the third pulse of the curve C from the left occurs at such a time. This occurrence of the third pulse in curve C causes the "and" gate 22 to produce an output signal which triggers the flip-flop 24 to its second stable state.

The above described triggering of the flip-flop 24 to its second stable state, causes the signal designated E in FIGURE 1 and illustrated by the curve F in FIGURE 2 to render the triode 80 conductive. This causes the relay 84 to be energized so as to activate the alarm unit 86.

The above described energizing of the relay 84 also causes the control unit 88 to be activated. The activating of the control unit causes the drive motor of the auxiliary memory drum 40 to be energized, so that the auxiliary memory drum may be brought up to operational rotational speed. The flip-flop 30 is then triggered to its second stable state to disable the "and" gates 50 and 52, and to enable the "and" gates 58, 60 and 54, 56.

When the "and" gates 54 and 56 are enabled, and the "and" gates 50 and 52 are disabled, the information from the information tracks on the memory drum 10 is written into corresponding ones of the information tracks on the now-activated auxiliary memory drum 40. As soon as that operation is completed, the "and" gates 58 and 60 are enabled, the required slight delay being provided by the delay line 59. Then, the information now recorded on the auxiliary memory drum 40 is read through the "and" gates 58 and 60, and through the "or" gates 62 and 64 to the computer 12.

The system of FIGURE 1, therefore, responds to a change in the speed of the memory drum 10 to cause the alarm unit 86 to be activated so as to apprise the operator of a malfunction in the main memory drum 10. The system is also equipped to cause the information on the memory drum 10 to be automatically transferred from the drum 10 to the auxiliary memory drum 40; to be read from the auxiliary memory drum 40 into the computer 12. Since the transfer from the main drum to the auxiliary drum can be achieved in one drum revolution; the delay provided by the delay line 59, which must elapse before the computer 12 can use the information from the auxiliary memory drum, is extremely short and corresponds to but a single drum revolution.

As described above, the function of the drum slow-down detector system of the invention is to provide a signal which indicates when the speed of a magnetic memory drum has fallen below a pre-determined rotational speed. When such a situation occurs, a signal is produced indicating that the drum has slowed down.

Figure 3:
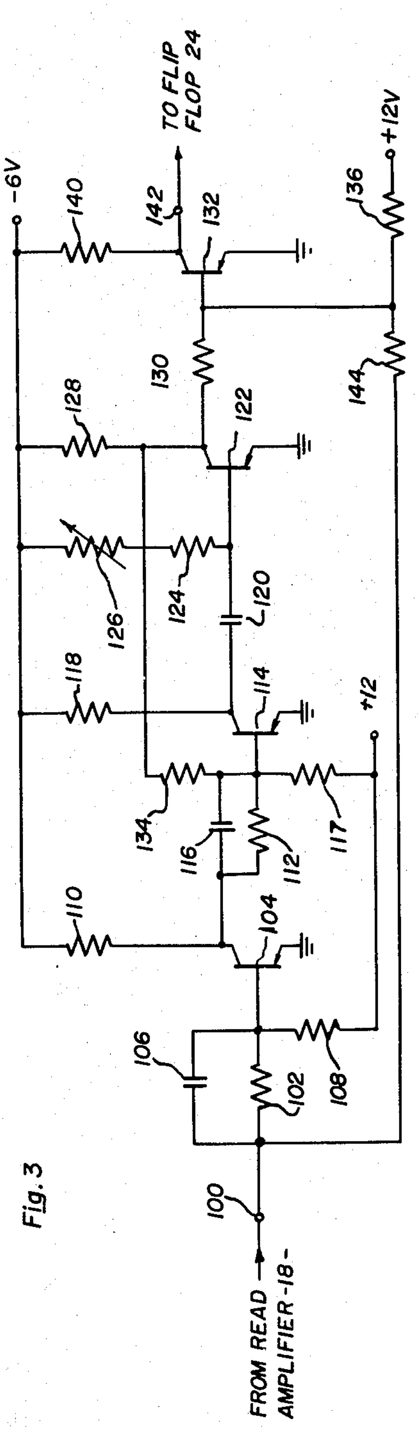
FIGURE 3 is a circuit diagram of an improved detector for use in the control system of the invention.

A schematic diagram of an appropriate detector constructed in accordance with a second, presently preferred embodiment of the invention is shown in FIGURE 3. This detector, unlike the control system of FIGURE 1, does not require a standard frequency pulse generator, such as the generator 26.

The detector circuit of FIGURE 3 includes an input terminal 100 which receives, for example, the recorded control pulses from the read amplifier 18 of FIGURE 1. The input terminal 100 is connected through a resistor 102 to the base of a transistor 104. The resistor 102 is shunted by a capacitor 106. The base of the transistor 104 is connected through a resistor 108 to the positive terminal of a 12 volt direct voltage source. The resistor 102 may have a resistance of 2.2 kilo ohms, and the capacitor 106 may have a capacity of 5 microfarads. The resistor 108 may have a resistance of 62 kilo ohms. The transistor 104 may be of the type presently designated 2N393.

The emitter of the transistor 104 is grounded, and the collector of the transistor is connected through a resistor 110 to the negative terminal of a 6 volt direct voltage source. The resistor 110 may have a resistance of 680 ohms. The collector of the transistor 104 is also connected through a resistor 112 to the base of a transistor 114. The resistor 112 is shunted by a capacitor 116. The resistor 112 may have a resistance of 2.2 kilo ohms, and the capacitor 116 may have a capacity of 50 micro microfarads. The transistor 114 may be of the type designated 2N393. The base of the transistor 114 is connected through a resistor 117 to the positive terminal of a 12 volt direct voltage source. The resistor 116 may have a resistance of 62 kilo ohms. The emitter of the transistor 114 is grounded, and its collector is connected through a resistor 118 to the negative terminal of a 6 volt direct voltage source. The resistor 118 may have a resistance of 680 ohms. The collector of the transistor 114 is coupled through a coupling capacitor 120 to the base of a transistor 122. The capacitor 120 may have a capacity of .06 microfarad. The transistor 122 may also be of the type designated 2N393. The base of the transistor is connected to a resistor 124 which, in turn, is connected through a variable resistor 126 to the negative terminal of a 6 volt direct voltage source. The resistor 124 may have a resistance of 5 kilo ohms, and the potentiometer 126 may have a resistance range of from 0 to 5 kilo ohms.

The emitter of the transistor 122 is grounded, and the collector of the transistor is connected to a resistor 128 and to a resistor 130. The resistor 128 may have a resistance of 680 ohms, and it is connected to the negative terminal of the 6 volt direct voltage source. The resistor 130 may have a resistance of 1 kilo ohm, and it is connected to the base of a transistor 132. The collector of the transistor 122 is also connected through a resistor 134 back to the base of the transistor 114. The resistor 134 may have a resistance of 2.2 kilo ohms.

The transistor 132 may be of the type designated 2N393. The base of the transistor 132 is connected to a resistor 136. The resistor 136 may have a resistance of 62 kilo ohms, and it is connected to the positive terminal of a 12 volt direct voltage source. The collector of the transistor 132 is connected through a resistor 140 to the negative terminal of a 6 volt direct voltage source. The resistor 140 may have a resistance of 680 ohms. The collector of the transistor 132 is also connected to an output terminal 142. This output terminal may be connected to the left input terminal of the flip-flop 24 in FIGURE 1, and the circuit of FIGURE 3 functions in a manner to be described to trigger the flip-flop 24 whenever the memory drum 10, for example, slows down below a pre-determined threshold.

The detector of FIGURE 3, as noted above, does not use a standard frequency source, such as the pulse generator 26 in FIGURE 1. Instead, the detector of FIGURE 3 examines the time interval between successive ones of the pulses read from the magnetic memory drum 10 and amplified by the amplifier 18, and it produces an output signal in response to such pulses when the drum speed falls below a pre-determined rotational speed.

The recorded pulses of FIGURE 2*a*, as read and amplified by the amplifier 18 of FIGURE 1, are applied to the input terminal 100 of FIGURE 3. These pulses are applied simultaneously to the base of the transistor 104 and to the base of the transistor 132. The pulses are applied to the base of the transistor 132 through a resistor 144, which may have a resistance of 2.2 kilo ohms. The pulses introduced to the base of the transistor 104 are applied through the resistor 102 and through the shunting capacitor 106.

The transistors 114 and 122 are connected as a one shot multivibrator in which the transistor 114 is normally nonconductive and the transistor 122 is normally in a fully conducttive saturated condition. The circuitry of the transistor 104 inverts the pulses from the read amplifier 18, and the circuitry applies the inverted pulses to the base of the transistor 114 to trigger the one shot multivibrator successively from its stable state to its unstable state. As the one shot multivibrator is so triggered, the transistor 114 becomes fully conductive and the transistor 122 becomes non-conductive. The one shot multivibrator returns in each instance to its stable state at the end of a time interval determined by the parameters of the multivibrator circuit.

The output from the one shot multivibrator, and the pulse output from the read amplifier 18, are both applied to the base of the transistor 132. As shown by the timing diagram of FIGURE 4A, so long as the drum 10 in FIGURE 1 is rotating at a normal speed, the pulses from the read amplifier 18 occur at times when the output from the multivibrator is negative. Therefore, the transistor 132 is held in a fully conductive condition at all times. Therefore, during the normal operation of the drum 10 in FIGURE 1, the potential of the output terminal 142 remains essentially at zero.

Figure 4A:
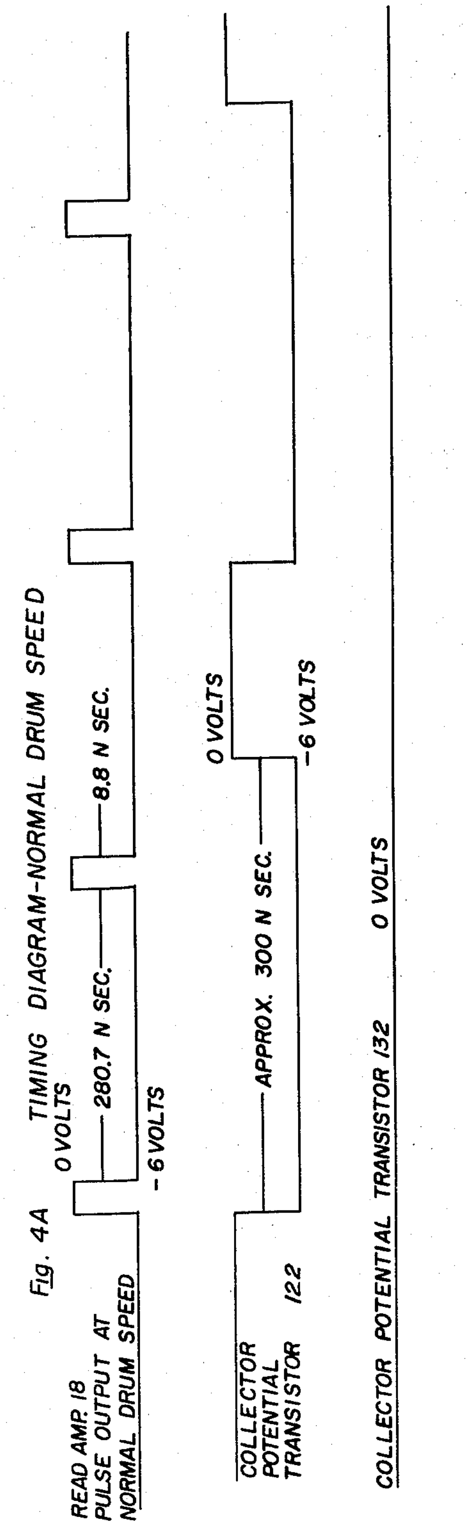
FIGURES 4A and 4B are timing curves useful in explaining the operation of the circuit of FIGURE 3.
Figure 4B:
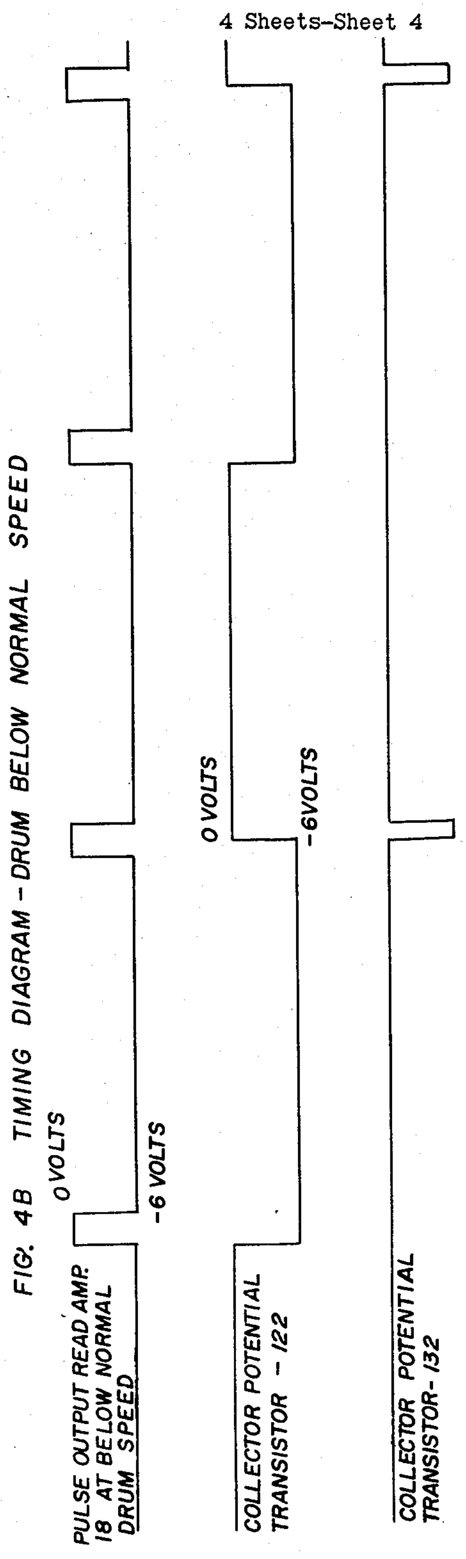

Should the magnetic memory drum 10 slow down for any reason, however, and as shown by the timing diagram of FIGURE 4B, the pulses from the amplifier 18 occur, at least partially, at a time when the multivibrator is introducing zero potential to the base of the transistor 132. This causes pulses to occur at the collector of the transistor 132, as shown by the lower curve in FIGURE 4B. These latter pulses may be used to trigger the flip-flop 24 in FIGURE 1 to the selected one of its two stable states so that the afore-described alarm and control effects may be obtained.

The capacitors 106 and 116 in the base circuits of the transistors 104 and 114 are included in the circuits for "speed-up" purposes. These capacitors make it possible to eliminate a delay line in the connection from the input terminal 100 through the resistor 144 to the base of the transistor 132. The resistor 130, between the collector of the transistor 122 and the base of the transistor 132 is given a value of 1 kilo ohm, rather than 2.2 kilo ohms, so as to make the system relatively insensitive to variations in the supply voltage.

In a typical constructed embodiment of the invention, and as shown by the timing diagram of FIGURE 4A, the pulses from the read amplifier 18 occur normally at approximately 280 micro second intervals. Each of these pulses, as noted, triggers the one shot multivibrator from its stable state to its unstable state. In each case, the one shot multivibrator remains in its unstable state for a period of time which lasts until after the next pulse from the read amplifier 18 has terminated, so long as the drum 10 is rotating above the threshold rotational speed. As shown in FIGURE 4A, this interval in the constructed embodiment of the invention is about 300 microseconds. The exact time of this interval will depend on the setting of the variable resistor 126 in FIGURE 3, and it is determined by the desired rotational speed at which the slow down indicating signal is to occur.

The signal at the collector of the transistor 122 is applied to the base of the transistor 132. As shown by the timing diagram of FIGURE 4A, this signal is −6 volts, in the constructed embodiment, during the time the one shot multivibrator is in its unstable state. When the one shot multivibrator resets to its stable condition, the collector of the transistor 122 becomes zero, as shown by the center curve of FIGURE 4A. However, as described above, the voltage from the read amplifier is −6 volts at this time, and the transistor 132 is held in its fully conductive saturated state. Therefore, during normal operation, the transistor 132 is held in its fully conductive saturated state at all times, and the potential at the output terminal 142 in FIGURE 3 is held at zero. This condition is represented by the lower curve in FIGURE 4A. So long as this normal condition presists, the flip-flop 24 of FIGURE 1 remains in the state to which it was originally set.

Now should the magnetic memory drum 10 of FIGURE 1 start to slow down, the time between consecutive pulses from the read amplifier 18 increases. This condition is shown by the top curve in FIGURE 4B. The duration of the unstable state of the one shot multivibrator, of course, is not effected by the repetition frequency of these pulses. Therefore, when the drum slows down to the point where the pulse voltage is zero at the same time when the output voltage from the one shot multivibrator is zero, both inputs to the transistor 132 become zero. This causes the transistor 132 to go into its nonconductive condition. When the transistor 132 becomes nonconductive its collector potential becomes negative, for example, −6 volts, and this will cause the flip-flop 24 to change state. As described above, this flip-flop 24 may be used to provide an indication that a drum slow down has occurred, and it can initiate the transfer of information from the main drum to an auxiliary drum in the manner described above.

Figure 5:
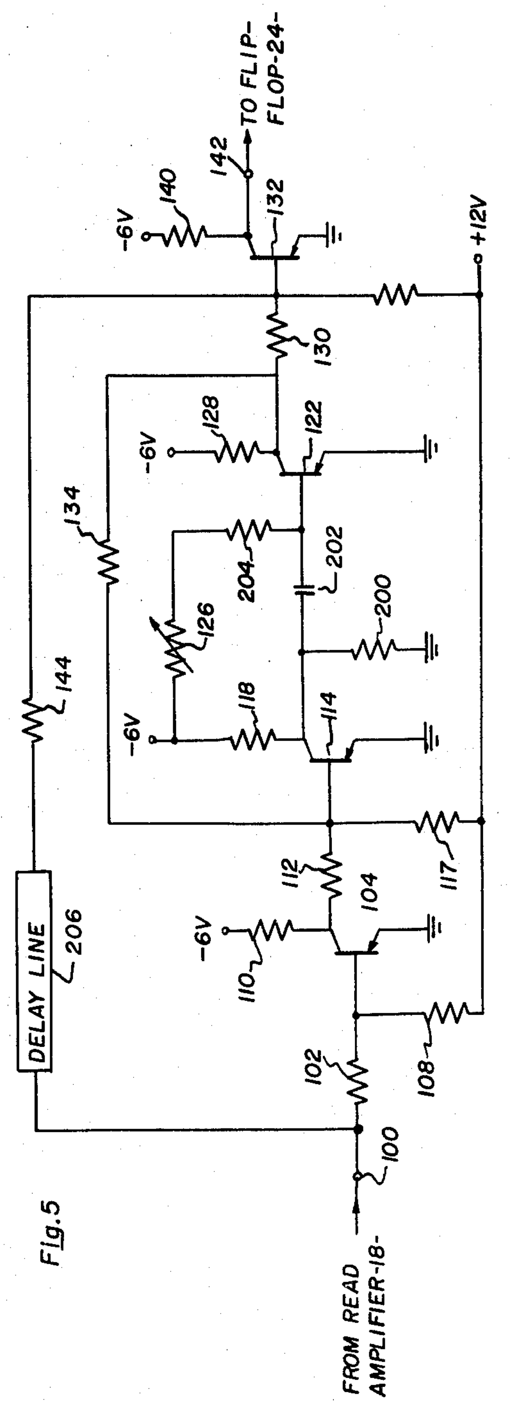
FIGURE 5 is a modification of the circuit of FIGURE 3.

The circuit of FIGURE 5 represents a modification of the circuit of FIGURE 3. In both circuits, like elements have been denoted by the same numerals. In the circuit of FIGURE 5, a resistor 200 is connected between the collector of the transistor 114 and ground. This resistor may have a value, for example, of 910 ohms. Also, the timing capacitor 120 in the circuit of FIGURE 3 has been replaced by a capacitor 202 having a value, for example, of .09 microfarad. Likewise, the resistor 124 has been replaced by a resistor 204 having a resistance, for example, of 5.1 kilo ohms.

A delay line 206 is interposed in the connection from the input terminal 100 to the base of the transistor 132, in series with the resistor 144. Also, the speed-up capacitors 106 and 116 have been removed from the circuit of FIGURE 5.

The delay line 206, which may exhibit a delay, for example, of .04 microsecond was inserted in the connection to the base of the transistor 132 to insure that a signal race would not occur between the signals applied to that transistor. That is, the delay line 206 assures against a signal race between the pulses from the input terminal 100, and the pulses from the one shot multivibrator. Having thus prevented such a signal race, the speed-up capacitors 106 and 116 of the circuit of FIGURE 3 are not required, and these capacitors have been omitted.

The resistor 200, from the collector of the transistor 114 to ground is added in order to prevent the voltage applied to the base of the transistor 122 from becoming excessively positive, thereby preventing the ratings of the transistor 112 from being exceeded. The addition of this capacitor changes the circuit parameters, thereby requiring a new value for the timing capacitor, as represented by the capacitor 202.

The invention provides, therefore, a new and improved control system for use with the main memory drum of a digital computer, and which is capable of responding to changes in the speed of the main memory drum so as to apprise the operator of a malfunction in the memory drum system. The control system of the invention, as described above, can also be adapted to provide for the transfer of information automatically from the main memory drum to an auxiliary memory drum, and for the auxiliary memory drum to be brought into the computer system, upon such indication of malfunction of the main memory drum.

The control system of the invention is extremely useful, for example, in applications in which the uninterrupted operation of a digital computer is of paramount importance.

We claim:

1. In combination: a first movable memory means, first control circuit means coupled to said first memory means for developing an output signal indicative of the speed thereof, second control circuit means coupled to said first control circuit means and responsive to the output signal developed thereby for producing a control signal when the speed of said first memory means changes from a pre-determined value a second movable memory means, and logic circuitry coupled to said second control circuit means and to said first and second memory means and responsive to said control signal for transferring information from said first memory means to said second memory means when the rotational speed of said first memory means changes from a pre-determined value.

2. A control system for use with a rotatable magnetic memory drum having a series of impulses recorded in a track thereon, said control system including: reading circuit means magnetically coupled to said track on said drum for producing in response to the impulses recorded therein a series of electrical pulses having a repetition frequency dependent upon the rotational speed of the memory drum, monostable multivibrator means coupled to said reading circuit means and responsive to said series of electrical pulses for producing a rectangular wave output signal, reference frequency generator means for producing a series of reference electrical pulses having a pre-determined invariable reference repetition frequency, gate circuit means coupled to said monostable multivibrator and to said reference frequency generator and responsive to said rectangular wave signal and to said reference pulses for producing an output control signal when the rotational speed of said memory drum drops below a pre-determined value, and control means coupled to said gate circuit means and responsive to said output control signal for producing a control effect.

3. A control system for use with a first magnetic memory drum and an auxiliary magnetic memory drum, said first magnetic memory drum having a series of impulses recorded thereon, said control system including: reading circuit means coupled to said first memory drum for producing in response to the impulses recorded thereon a series of electrical pulses having a repetition frequency dependent upon the speed of the first memory drum, monostable multivibrator means coupled to said reading circuit means, said multivibrator means being triggerable by each of said electrical pulses from a stable condition to an astable condition, and returning to its stable condition after a time interval greater than the time between successive ones of said electrical pulses when said first memory drum is moving at a predetermined speed, and said multivibrator being responsive to said electrical pulses from said reading circuit means for producing a rectangular wave output signal having a first amplitude value when said multivibrator is in its stable condition and a second amplitude value when said amplitude vibrator is in its astable condition, further circuit means coupled to said monostable multivibrator means and to said reading circuit means and responsive to said rectangular wave signal from said multivibrator and to said electrical pulses from said reading circuit means for producing an output control signal when the speed of said first memory drum drops below a predetermined value, such that the time interval in which said multivibrator returns to its stable condition from its unstable condition is less than the time between successive ones of said electrical pulses, and control means coupled to said further circuit means and responsive to said output control signal, said control means including logic circuitry for transfering information from said first magnetic memory drum to said auxiliary memory drum in response to said output control signal.

References Cited in the file of this patent

UNITED STATES PATENTS

| | | |
|---|---|---|
| 2,860,323 | Burkhart et al. | Nov. 11, 1953 |
| 2,876,004 | Sink | Mar. 3, 1959 |
| 2,963,555 | Brubaker | Dec. 6, 1960 |
| 2,968,803 | Lindley | Jan. 17, 1961 |